Feb. 24, 1959   B. D. FREDERICO   2,875,405
HIGH FREQUENCY MEASURING INSTRUMENT AND RESISTANCE UNIT
Filed Nov. 16, 1954   2 Sheets-Sheet 1

INVENTOR
Blossy D. Frederico
BY Schramm and Knowles
ATTORNEYS

Feb. 24, 1959      B. D. FREDERICO      2,875,405

HIGH FREQUENCY MEASURING INSTRUMENT AND RESISTANCE UNIT

Filed Nov. 16, 1954      2 Sheets-Sheet 2

INVENTOR
Blossy D. Frederico
BY Schramm and Knowles
ATTORNEYS

United States Patent Office 2,875,405
Patented Feb. 24, 1959

2,875,405
HIGH FREQUENCY MEASURING INSTRUMENT AND RESISTANCE UNIT

Blossy D. Frederico, Cleveland, Ohio, assignor to Bird Electronic Corporation, Cleveland, Ohio, a corporation of Ohio Application November 16, 1954, Serial No. 469,174

The terminal portion of the term of the patent subsequent to November 25, 1974, has been disclaimed 12 Claims. (Cl. 324—95)

This invention relates to electrical measuring devices for use at high frequencies, adjustable resistance units and adjustable voltage dividers. The invention is particularly concerned with the provision of such a device for use over a wide frequency band.

High frequency electrical instruments present design and assembly problems that complicate creation of commercially successful devices. The effects of distributed capacitance and inductance disturb results obtained when components are conventionally arranged and connected. It has been generally recognized that the desired theoretical results can be more effectively approached in practice by resorting to compact assemblies having short connections. The obtaining of short electrical connections between components of a high frequency electrical measuring device of the character referred to is therefore one of the principal objectives of the present invention, it being thus sought to obtain close adherence to theoretical circuit requirements and thereby improve operating accuracy generally.

Another objective is to provide a high frequency electrical device suitable for use in the measurement of voltage or power, for the supply of an adjustable voltage or for providing an adjustable magnitude of resistance, embodying components arranged in a compact rugged assembly that can be put together readily in original production and can be serviced and repaired easily.

Another object is to provide an instrument which provides for easy adjustment in original assembly and also in subsequent service to compensate for variations in sensivity of components employed in the instrument. As a specialized phase of the adjustability feature the invention affords a compact pickup cartridge useful in numerous applications in combination with a tubular high frequency electrical conductor, the mounting of the cartridge on the conductor for relative bodily movement affording a variation of relationship which permits not only the adjustment referred to for incidental fluctuations in sensitivity of the electrical components incorporated in the cartridge, but also permits the use of the same cartridge in instruments designed for widely varying ranges of power or energy.

A further object of the invention is to provide a combination single instrument in which the same unit serves both as a reflectionless termination for a high frequency coaxial transmission line and an adjustable voltage pickup connection for an absorption type milliwattmeter.

A further object of the invention is to provide improved reliable, accurate, sturdy, and dependable apparatus for running tests on low-power transmitters such as walkie-talkies and the like, trouble shooting maintenance, production and acceptance tests, tests on insertion devices, such as connectors, filters, switches, tuning stubs, patch cords, and the like and which may also be used as an accurate radio frequency resistance having its resistance value substantially independent of frequency.

Other objects and advantages pertain to certain features of construction and combinations and arrangements of parts by which are obtained simplicity and economy, as well as improved operating characteristics. Such will become apparent from the following detailed description of a preferred embodiment of the invention. This description is made in conjunction with the accompanying drawings.

Figures 1, 2:
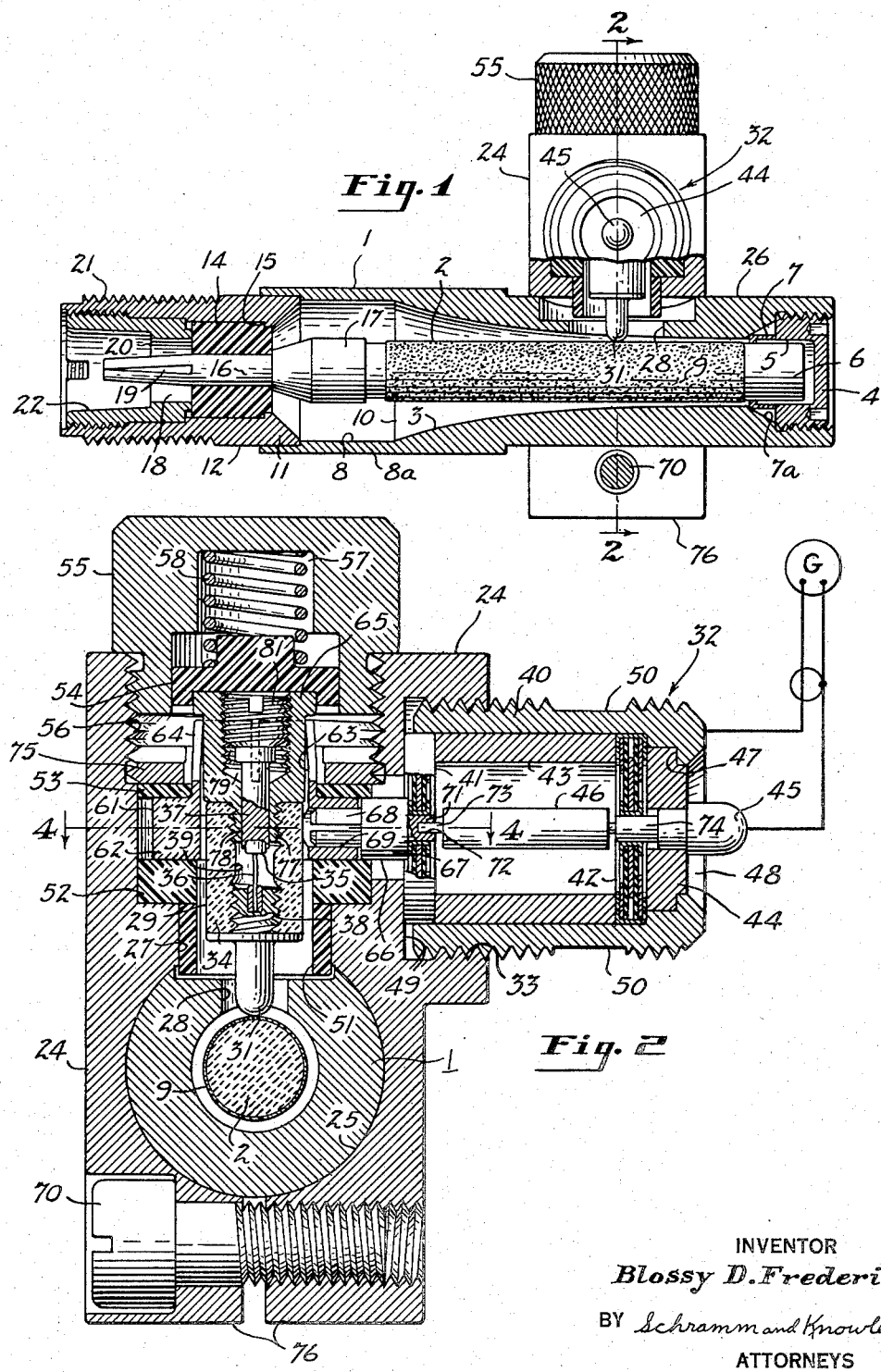
Fig. 1 is an elevational view principally in longitudinal section with parts broken away and removed, of a high frequency measuring instrument embodying the principles of the present invention, the instrument being of the peak reading meter type employing a capacitance-type peak voltage storage and incorporating in the combination a pickup or rectifier cartridge assembly.
Fig. 2 is a view in cross-section represented as cut by a vertical plane through the probe and rectifier assembly or cartridge showing the latter as mounted on a coaxial type reflectionless termination represented as cut by a plane 2—2 indicated in Fig. 1 but enlarged with respect to that figure.

The electrical instruments or devices embodying the present invention are characterized by a pickup or coupling cartridge and rectifier assembly in combination with a tubular electrical line having an access aperture. In an illustrative embodiment shown in the drawings the invention is used as a milliwattmeter or voltmeter of the peak reading type in which the pickup or coupling cartridge carrying the rectifier is mounted on the coaxial line which is in the form of a reflectionless termination, the electrical line comprising an outer conductor 1 and an inner conductor 2. This instrument provides accurate voltage division independent of frequency and is intended for use over a wide range of frequencies. Although not limited thereto, it is especially useful in the frequency range from about five to five hundred megacycles, utilizing a resistive termination capable of dissipating approximately five watts although capable of substantial overload at the power input. It will be apparent, however, that the principles disclosed in connection with this embodiment are useful in other types of instruments and over other wide frequency bands or at single frequencies by suitable modification.

The outer conductor, a circular-sectioned turning of brass or similar metal, is formed with an internal tapered horn surface 3, coaxial to the inner conductor 2, which comprises an elongated cylindrical rod or tube, of insulating material such as ceramic material for example, having deposited upon the surface thereof a resistance carbon film indicated at 9. The curvature of the surface 3 and the resistance of the carbon film conductor 9 are so related in accordance with known principles that at each point along the length of the line, the center conductor termination resistance between such point and the end of the line is equivalent to the characteristic impedance of the line measured at that point. Here the rod or tube carrying the resistive film 9 is a nominal one quarter inch in diameter and the effective length of the resistive film is one and one half inches, the other parts being proportioned as shown to provide about five watts power absorption on a nominal fifty ohm line.

A metal plug 4 that is screwed into an internally threaded counterbore in one end of the outer conductor 1 bears axially against a metallic split ferrule 7 that embraces a metalized or conductive paint band 6 on the corresponding end of the inner conductor or resistance rod 2. The ferrule, by reason of its engagement in a tapered portion 7a of the outer conductor bore is forced to grip upon the metalized paint contact band 6 of the inner conductor or resistance rod tightly for providing a good electrical line contact substantially at the minimum diameter of the tapered horn surface 3. The plug 4 is formed with a cylindrical recess 5 that receives the end of the inner conductor or resistor rod. The band 6 of aluminum or other conductive metal paint establishes an electrical connection between the resistance carbon film 9 and the metal ferrule 7 and through the latter shorts the inner conductor or resistance rod to the tapered outer conductor 1 at the small diameter end of the latter.

At its end opposite that receiving the plug 4 the conductor member 1 is formed with a tubular cylindrical line extension 8a that has an internal cylindrical surface 8 continuous with the tapered surface 3, joining the latter at a circular line indicated at 10. The tubular line extension 8a telescopically receives the end 11 of a combined line connecting and mounting element 12 comprising a turning of brass or similar material. Within the element 12 an annular insulator 14 of suitable dielectric or insulating material such as polytetrafluoroethylene is located in a counterbore against a radial shoulder 15 and supportingly receives a center rodlike connector 16. The connector is formed at one end with an enlarged tubular socket portion 17 which receives, as by a press fit, the end of the ceramic tube or rod bearing the resistive carbon film 9 and with the latter comprises the center conductor or resistor rod 2. The resistive film of the inner conductor extends into the cylindrical socket on the connector portion 17 and preferably carries a protective band of silver or other conductive paint to give good electrical connection between the resistive film and the center connector 16.

The outer end of the connector element 16 projects axially through an internal chamber or passage 18 of the connector element 12 and is axially bored and slotted, as indicated at 19, to receive grippingly the center contact pin of a standard coaxial line fitting (not shown) used in connecting the device to a suitable signal generator, radio transmitter, wattmeter or the like, as will be well understood by those skilled in the art. The central passage 18 in the connector element 12 is counter-bored at its outer end to provide the usual tapered socket and shoulder 20 for receiving and locating the tubular outer coupling unit of the coaxial outer line fitting being attached to the device.

External threads 21 on the outer end of the element 12 receive the coupling nut of such a coaxial line fitting. If desired, the connector element 12 may be formed with a separate externally threaded bushing unit or retaining sleeve 22 adapted to mate corresponding internal threads in the connector unit 12 for securing the annular insulator 14 against the shoulder 15 and providing the internal passage 18 and shoulder 20.

Electrical energy is fed into the present device, as from a high frequency generating source, which is to be tested or measured, through a suitable coaxial transmission line connected to the device through the outer connector element 12 and the inner connector element 16, the electrical energy for the device having a frequency of the order of five to five hundred megacycles. The termination, comprising the tapered surface 3 of the outer conductor 1 and the resistive film 9 of the inner conductor 2, absorbs such energy to the extent of about five watts substantially without reflection, it being understood that the several diameter and dielectric changes along the length of the line, including that portion formed by the inner and outer portions 16 and 12, respectively, are suitably proportioned to maintain the characteristic impedance of the line, here nominally fifty ohms, in accordance with well-known considerations.

One way in which energy transmitted along a coaxial line has been measured is by sampling through the use of a voltage pickup of the capacitive or resistive type and by utilizing the sample portion of energy or voltage to influence an indicator such as a galvanometer. To obtain a suitable sample from the main coaxial line without distortion, to rectify the sample still without distortion, and then to impress the rectified portion on a galvanometer external to the line has presented numerous difficulties related to the structure or geometry of the line and instrument components, particularly in connection with the measurement of electrical voltage or energy in the high frequency ranges.

In accordance with the present invention the sampling of voltage is accomplished by a unique form of resistance voltage divider arrangement whereby the reflectionless termination serves simultaneously as a line termination and adjustable voltage divider of constant ratio for different frequencies. A unitary pickup or cartridge assembly is employed in connection therewith. The entire assembly is characterized by short connections between components and the arrangement of components such as a probe, a rectifier, and associated elements of a coaxial line connection on a common axis.

To receive such a pickup assembly, preferably in removable or adjustable relation, the coaxial line structure described is provided with a tubular mounting member or pickup shell 24 having a transverse opening 25, fitting and adapted to receive the outer surface 26 of the hollow conductor member 1. The tubular mounting member 24 also has an internal socket or coaxial bore 27 registering with an axially elongated opening or slot 28 in the wall of the hollow conductor member 1. A rectifier unit 29 is mounted within the socket or bore 27 in such a manner to be insulated from the conductive shell 24 and is provided with a probe 31 adapted to make contact with the outer surface of the rod 2. Bands or dots of conductive paint such as aluminum or silver may be sprayed along the surface of the rod 2 for improving the contact with the probe 31.

For receiving a peaking condenser assembly 32, the shell 24 is formed with a lateral opening 33 registering with the portion of the coaxial bore 27 in which the rectifier 29 is mounted. This rectifier is of any one of several well-known constructions such as that marketed by the General Electric Company and known as Germanium Diode Model G7B, or Sylvania and known as Model 1 N21B or 1 N79. It comprises a germanium pellet or semiconductor crystal 35 contacted by a metal wire or so-called cat whisker 36. In the case of the Model 1 N21B rectifier, the crystal and cat whisker are mounted on the ends of posts or pins 37 and 38 of nickel or similar metal. The pin 38 may be integral with the probe 31. The pin 37 and post 38 are received snugly within opposite ends of a hermetically sealed center passage 39 of a tubular cylindrically shaped insulating body 34 of the rectifier unit, each being held in any suitable manner.

As illustrated, the pin 37 is adjustably mounted in a conductor plug 65 of brass or like metal having a threaded stub 77 set in the passageway 39 of the insulator 34. The post 38 is likewise externally threaded and set in the opposite end of the passageway 39 of the insulator 34. The insulator 34 may be composed of ceramic material molded onto the threads of the post 38 and the stub 77. The conductor plug 65 is provided with a bore 78 to receive the pin 37, which carries the germanium pellet 35, and has a counter bore 79 threaded to receive a threaded head portion 81 of the pin 37 to provide for adjustability of the axial position of the pin 37 in the insulating body 34. The passage 39 is preferably filled with suitable gelatinous material for hermetic sealing of the germanium pellet 35.

The condenser unit 32 comprises a conductive shell 40 such as a turning of brass or similar metal threaded into the lateral socket 33 of the pickup shell 24. Mounted therein are button type condensers 41 and 42 spaced by a conductor sleeve 43. Preferably a metal plug 44 is provided for better securing the condenser 42 and receiving a center, conductive terminal unit 45. A resistance element 46 is axially mounted within the unit 32, electrically connected to and supported at both ends by its end terminals within the central terminals of the condensers 41 and 42.

As shown in the drawing, the entire assembly is secured by reason of the shoulder 47 within an outer opening 48 of the unit 32 by screwing the unit 32 into the threaded socket 33, which causes the condenser 41 to bear against the side surface 49, preferably flattened, of the conductive pickup shell 24. The shoulder 47 presses the plug 44 against the condenser 42, pressing the latter against the sleeve 43, which bears against the condenser 41. For enabling the shell 40 to be tightened against the pickup cartridge 24 by means of a wrench, flattened sides 50 may be formed therein.

The rectifier unit 29 is resiliently supported within the shell 24 in such a manner as to cause the probe 31 to bear lightly but firmly against the carbon resistance surface of the center rod 2. Moreover, the mounting is such that the rectifier unit is insulated from the shell 24. To this end insulating rings 51, 52 and 53 are mounted in suitable recesses in the bore of the shell 24 and an insulating cap 54 is provided for supporting the upper end of the rectifier unit 29. For causing the insulating cap 54 to bear resiliently downward against the upper end of the rectifier unit 29, a securing cap 55 is provided, adapted to mate with an internal thread 56 in the shell member 24 and having a socket 57 for receiving an helical compression spring 58 bearing against the top of the cap 54.

For centering the rectifier unit 29 and making electrical contact therewith, a contact ring unit 61 is provided having an annular portion 62 adapted to rest between the insulating rings 52 and 53 and having a hollow cylindrical upper portion 63 slotted to provide spring fingers 64 which are bent inward to bear against the conductor plug 65 at the upper end of the tubular cylindrical insulating body 34 of the rectifier 29, which is connected to the post or pin 37.

For electrically connecting the left hand end (as seen in Fig. 2) of the charge resistor 46 to the ring connector unit 61, a spring pin connector 66 is provided, comprising a body 67 with spring plug fingers 68 adapted to fit an opening 69 formed in the ring contact unit 61. The connector 66 has a stem 71 with a socket 72 to receive the contact pin 73 of the resistor unit 46. The center conductive unit 45 also has a stem 74 connected in like manner to the right hand end of the charge resistor 46.

It will be understood that when the apparatus is assembled the shell 24 is first mounted on the hollow outer conductor 1. The insulating rings 51 and 52 are inserted, then the ring connector unit 61 is inserted, followed by the insulating ring 53 and an annular screw locking or holding contact block 75, which holds this portion of the assembly securely in place. The contact plug 66 is, of course, inserted before the button condensers 41 and 42 and the resistor 46 are assembled with the peaking condenser unit 32.

The rectifier unit 29 is inserted through the spring fingers 64 in the ring connector or adapter unit 61 before the insulator cap 54, the spring 58 and the securing cap 66 are mounted in place.

Figure 3:
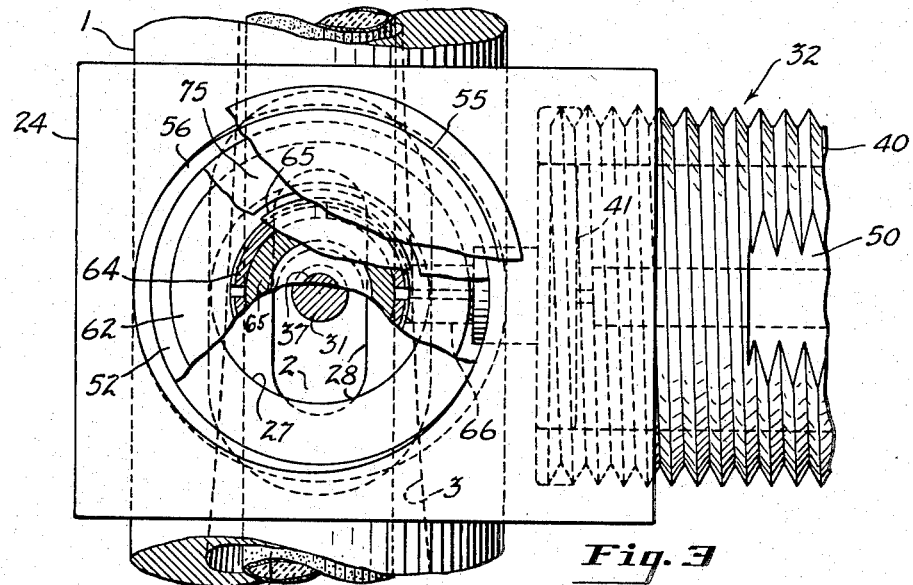
Fig. 3 is a plan view, partially in section, corresponding to the scale of Fig. 2 illustrating the apparatus of Fig. 1 as seen from above, with portions broken away to expose a portion of the coaxial line termination unit and the interior thereof.
Figure 4:
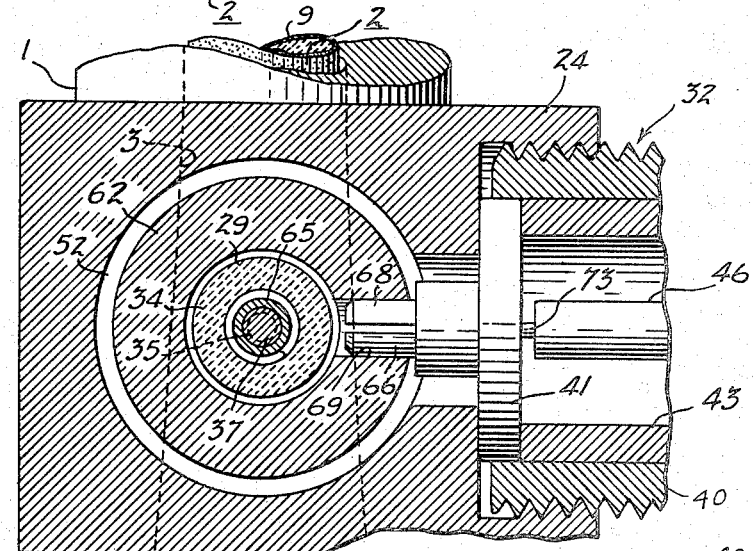
Fig. 4 is a view of a cross-section of the apparatus represented as cut by a horizontal plane 4—4 indicated in Fig. 2.

For adjusting the ratio of voltage picked up to that received at the input end of the hollow conductor unit 1, the axial position of the pick up shell 24 with respect to the conductor 1 is adjusted. The probe 31 is caused to slide in whichever direction may be necessary along the cylindrical surface of the rod 2 in the space provided by the elongated slot 28 (Fig. 3). When the desired position has been ascertained the shell 24 is secured on the conductor tube by a tightening of the bolt 70 for contracting the split lower end 76 of the shell 24.

Figure 5:
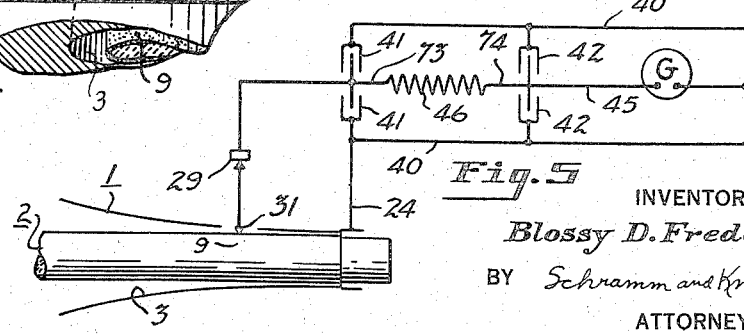
Fig. 5 is an electrical circuit diagram of the assembly.

The electrical connections of the elements are shown schematically in the circuit diagram of Fig. 5. As illustrated, contact is made between the probe 31 and the surface of the rod 2. The conductor shell 40 of the peaking condenser assembly is electrically connected to the hollow outer conductor 1 through the metal of the pickup shell or cartridge 24. The outer plates of the charge condenser 41 and the radio frequency by-pass condenser 42 are likewise both connected to the condenser unit shell 40. The rectifier 29 is connected in series between the probe 31 and the left end contact pin 73 of the resistor 46, the pin 73 being connected also to the inner plates of the button type charge condenser 41. The right hand end of the resistor 46 is connected to the inner plates of the frequency bypass condenser 42 as well as to the center conductor terminal unit 45. The galvanometer G, as shown, is connected between the terminal unit 45 and the condenser unit shell 40. In consequence the peak value of the radio-frequency voltage appearing between the probe 31 and the right hand end of the co-axial conductors 1 and 2 is stored between the plates of the charge condenser 41; and the voltage in question may be measured by ascertaining the unidirectional or D.-C. voltage between the plates of the charge condenser 41 by means of a suitable device such as the galvanometer G calibrated in terms of R. M. S. voltage. Where it is desired to measure the power absorbed in the system, the power is measured in that portion of the rod 2 to the right of the probe 31. This is accomplished by calibrating the resistor 46 which is in series with the plates of the charge condenser 41 and the galvanometer G as understood by those skilled in the art.

In accordance with the patent statutes, the principles of the present invention may be utilized in various ways, numerous modifications and alterations being contemplated, substitution of parts and changes in construction being resorted to as desired, it being understood that the embodiment shown in the drawings and described above are given merely for purposes of explanation and illustration without intending to limit the scope of the claims to the specific details disclosed.

What I claim as new and desire to secure by Letters Patent of the United States is:

1. An absorption type milliwattmeter comprising a hollow outer conductor with an internal tapered horn surface, a central member secured therein having a coating of resistance material connected at one end to the portion of the horn surface of minimum diameter, the free ends of said members being adapted for electrical connection to a coaxial line, and a detector unit, said detector unit being mounted upon the outer conductor, the latter having an opening in the side thereof at the mounting position of said detector unit, said detector unit comprising a conducting body, a rectifier element mounted therein having a probe making contact with the resistance coating surface of the central member of the outer conductor and having an instrument terminal, said detector unit having a lateral opening with a peaking unit mounted thereon at said opening, said peaking unit comprising a conductive shell with a pair of button-type condensers at opposite ends thereof, and a longitudinal resistance element supported in the axis of said shell between said condensers, said condensers having outer terminals making contact with the conductive shell for making connection with the detector unit body and the hollow outer conductor, said condensers having central terminals, each connected to an end of the axial resistance element, one end of which is connected to the said terminal of the rectifier element, the other end of which is adapted for connection to a galvanometer together with the conductive shell for supplying a direct current representative of the peak value of rectified voltage provided by the rectifier element, representative of power input to the outer conductor and central member unit according to the calibration determined by the resistance of the axial resistance element.

2. Apparatus as in claim 1 wherein the hollow outer conductor is provided with an elongated slot for receiving the contact-making probe of the detector unit and the detector unit is slideable longitudinally with respect to the hollow outer conductor for adjusting the ratio of voltage division provided by the detector unit.

3. A reflectionless termination for a coaxial transmission line adapted for voltage division, comprising a hollow outer conductor with an internal tapered horn surface, a coaxial resistance rod mounted within said conductor making electrical contact therewith at the portion of the tapered horn surface of minimum diameter, the opposite ends of the outer conductor and the resistance rod being adapted for electrical connection to a coaxial transmission line, said hollow outer conductor having an elongated lateral opening therein extending lengthwise of said conductor, a tap mounted in said opening, and a carriage slideable on said conductor supporting said tap, electrically insulated from the hollow conductor, the tap being adapted to make electrical contact with the resistor rod at a point intermediate the ends thereof for taking off a voltage having a ratio to the input voltage to the unit according to location of said tap relative to the ends of the resistance rod.

4. A reflectionless termination for a coaxial transmission line adapted for voltage division, comprising a hollow outer conductor with a bore shaped to form an internal horn surface portion tapering from a maximum diameter at a free end to a minimum diameter at a closed circuit end, the bore flaring beyond the closed circuit end of the tapered surface portion of the conductor to form a ferrule receiving taper portion, an elongated resistance rod inner conductor mounted coaxially within the bore in said outer conductor, said rod having a closed circuit end with a conductive coating thereon and a free end, a split conductive ferrule surrounding said conductively coated end of the resistance rod, a plug secured in the end of the bore in said outer conductor beyond the taper portion, said plug being arranged to bear against said ferrule for forcing the ferrule against said ferrule receiving taper portion of the bore and thereby contracting the ferrule against the conductively coated end of the resistance rod for electrically connecting the outer conductor and the resistance rod end at said ferrule, the free ends of the outer conductor and the resistance rod being adapted for electrical connection to a coaxial transmission line, said outer conductor having a lateral opening therein, and a tap mounted in said opening, electrically insulated from the outer conductor, adapted to make electrical contact with the resistance rod at a point intermediate the ends thereof for taking off a voltage having a ratio to the input voltage to the unit according to the location of said tap relative to the ends of the resistance rod.

5. A radio frequency resistor unit having a resistance substantially independent of frequency and adjustable in value comprising in combination a hollow outer conductor having an elongated lateral slot therein, the conductor being formed with an internal tapered horn surface tapering to a minimum diameter at one end thereof, a resistance rod mounted within said conductor along the axis thereof and electrically connected thereto at the end having the minimum diameter of the internal tapered surface, the opposite ends of the resistance rod and the conductor being adapted for connection to a coaxial transmission line, and a pickup cartridge surrounding said conductor and laterally extending, slideable along said conductor, said cartridge having mounted therein an insulated member with spring means urging said member resiliently inward toward said resistance rod and carrying a tap projecting into the elongated opening in said hollow conductor insulated from said conductor for making electrical contact with the resistance rod at various positions thereon along its axial length for adjustment of the resistance value.

6. A pickup unit for high frequency radio energy comprising a conductive body having an axial bore, insulator sleeve units mounted within said bore, a substantially cylindrical rectifier unit mounted within said bore centered by said insulator sleeve units, the bore of said conductive body being open at one end, said rectifier unit having a probe extending through the open end of said bore for receiving radio frequency energy, an insulating cap mounted in the opposite end of said bore for removal and replacement and securing said rectifier unit against axial movement in said bore, a conductive terminal on said rectifier unit at the opposite end from the probe thereof, a rectifier connector in said bore making contact with the rectifier terminal and having means for receiving a plug connector, means supporting the connector in insulated relation to the body, the connector making resilient sliding contact with the rectifier unit to permit facile removal and replacement of the latter, said conductive body having a lateral opening at said connector for providing access thereto.

7. A radio-frequency measuring device comprising a hollow outer conductor member with an internal tapered horn surface, a central resistance member secured therein connected at one end to the portion of the horn surface of minimum diameter, the free ends of said members being adapted for electrical connection to a coaxial line, and a detector unit mounted upon the outer conductor and movable therealong, the latter having an opening in the side thereof at the mounting position of said detector unit, said detector unit comprising a rectifier element mounted therein having spring means for urging it resiliently inward toward the resistance member, having a probe making contact with the central resistance member in the outer conductor and having an instrument terminal for connection to a galvanometer, said probe being thereby adapted for making electrical contact with the resistance member at various positions thereon along its axial length for adjustment of the resistance value.

8. In a system for sampling high frequency electrical energy, a line section comprising an inner resistive film conductor and a tubular outer conductor surrounding the resistive conductor in spaced coaxial relation, the outer conductor having a lateral aperture communicating with the space between the conductors at a point intermediate and spaced from both ends of the line section, a pickup assembly supported on the outer conductor over the aperture, said pickup assembly including a conductive supporting body, a rectifier and a probe contact carried by the conductive body in insulated relation, the probe contact projecting through the lateral aperture and being in substantially point contact association with the resistive film inner conductor intermediate and spaced from both ends of the latter, and means yieldingly biasing the probe contact against the resistive film to maintain said point contact.

9. In a system for sampling high frequency electrical energy, a line section comprising an inner resistive film conductor and a tubular outer conductor surrounding the resistive conductor in spaced coaxial relation, the outer conductor having a lateral aperture communicating with the space between the conductors at a point intermediate and spaced from both ends of the line section, a pickup assembly supported on the outer conductor over the aperture, said pickup assembly including a conductive supporting body, a rectifier and a probe contact, said probe contact being carried by the conductive supporting body in insulated relation, being electrically connected to the rectifier and being held in yielding electrically contacting association with the resistive film inner conductor at a point spaced from both ends of the latter, said pickup assembly being arranged for adjustment of the probe to shift the point contact longitudinally of the resistive conductor in varying the ratio of the resistances of the portions of the resistive film conductor between such point contact and the resistive film ends.

10. In a system for sampling high frequency electrical energy, a coaxial line section comprising an inner resistive film conductor and a tubular outer conductor surrounding the resistive conductor in spaced relation, a pickup assembly supported on the outer conductor, said assembly comprising a conductive supporting body having a chamber of circular section disposed with its axis normal to the line axis, a rectifier disposed in the body chamber along an axis normal to the line axis, a mounting ring embracing the rectifier in supporting relation, the mounting ring including resilient elements yieldingly engaging the rectifier, insulating means centering and axially locating the mounting ring in the body chamber, means yieldingly biasing the rectifier toward the line axis, the rectifier including a contact probe disposed and shaped to bear against and make point contact with the resistive film conductor, and an indicator circuit connected to the rectifier and the outer line conductor.

11. A pickup for a hollow transmission line comprising an outer conducting hollow body having an aperture adapted to join a transmission line, a rectifier mounted in the body and having a probe adapted to extend into the interior of a transmission line and having an instrument terminal, a peaking unit mounted on the body, said unit comprising a tubular conductive shell having a cylindrical chamber, means threadedly mounting the shell on the conductive body, the body being formed with a lateral opening continuous with the shell chamber at one end of the latter, a pair of button type condensers disposed in spaced parallel relation in the shell chamber, said condensers having outer circular peripheral terminals and center terminals, the outer terminals of one condenser being locatingly abutted against and electrically contacting the body about said lateral opening, shoulder means on the shell locatingly abutted against and electrically contacting the outer terminal of the other condenser, a thrust member in the chamber interposed between and abutting the outer terminals of the condensers, the threaded mounting means being adapted to draw the shoulder toward the body in assembly and thereby clamp the outer terminals of the condensers, one between the thrust member and the body, the other between the thrust member and the shoulder means on the shell, a resistance element extending axially through the chamber between the condensers and at its ends connected to the center terminals, the center terminal of one condenser being connected to the terminal of the rectifier, the center terminal of the other condenser being adapted for connection to a galvanometer together with the conductive shell for supplying thereto a direct current representative of the peak valve of rectified voltage provided by the rectifier.

12. A high frequency electrical measuring device comprising conductive body means including an outer conductor having an elongated chamber formed with a tapered horn surface, a resistance rod secured in the chamber coaxially, one end of the rod being electrically connected to the horn surface at the narrow end of the chamber, a coaxial transmission line connector at the other end of the resistor rod electrically connected thereto and to the surrounding portion of the horn surface, the conductive body means also being formed with a pickup chamber and a passageway between the chambers opening laterally into the elongated chamber intermediate the ends of the latter, a probe, circuit means in the pickup chamber mounting the probe in the body means in insulated relation to project into the elongated chamber through the passageway and to bear yieldingly in electrically contacting relation against the resistor rod intermediate the ends of the latter, said circuit and mounting means also including a rectifier having first and second terminals, a direct current meter connector fitting on the conductive body means, such fitting having an outer terminal electrically connected to the body means and a center terminal insulated from the outer terminal and electrically connected to the first rectifier terminal, the second rectifier terminal being connected to the probe for delivering to the meter connector fitting a voltage constituting a fraction of that appearing across the resistor rod.

References Cited in the file of this patent
UNITED STATES PATENTS

| | | |
|---|---|---|
| 2,273,547 | Von Radinger | Feb. 17, 1942 |
| 2,423,447 | Grimm | July 8, 1947 |
| 2,488,378 | Coltman | Nov. 15, 1949 |
| 2,556,607 | Wheeler | June 12, 1951 |
| 2,759,155 | Hackenberg | Aug. 14, 1956 |